United States Patent [19]

Seybold

[11] 4,455,128

[45] Jun. 19, 1984

[54] ROTARY INTERNAL COMBUSTION ENGINE WITH UNIFORMLY ROTATING PISTONS COOPERATING WITH REACTION ELEMENTS HAVING A VARYING SPEED OF ROTATION AND OSCILLATING MOTION

[76] Inventor: Frederick W. Seybold, 1979 Dogwood Dr., Scotch Plains, N.J. 07076

[21] Appl. No.: 330,678

[22] Filed: Dec. 14, 1981

[51] Int. Cl.³ .............................................. F02B 53/00
[52] U.S. Cl. ......................................... 418/34; 418/36
[58] Field of Search .................... 123/245; 418/33, 34, 418/36

[56] References Cited

U.S. PATENT DOCUMENTS

| | | | |
|---|---|---|---|
| 1,353,205 | 9/1920 | Woodward | 418/34 |
| 1,839,275 | 1/1932 | Sweningson | 418/34 X |
| 3,955,541 | 5/1976 | Seybold | 123/245 |
| 3,981,638 | 9/1976 | Hutterer | 418/34 |
| 4,057,374 | 11/1977 | Seybold | 418/36 |
| 4,136,661 | 1/1979 | Posson | 418/36 X |
| 4,174,930 | 11/1979 | Posson | 418/36 |

FOREIGN PATENT DOCUMENTS

| | | | |
|---|---|---|---|
| 2435823 | 2/1976 | Fed. Rep. of Germany | 418/34 |
| 160125 | 3/1921 | United Kingdom | 418/36 |

Primary Examiner—Michael Koczo

[57] ABSTRACT

A rotary internal combustion engine comprising a stationary, water cooled housing having a large cylindrical bore in which a hollow cylinder with end walls rotates at a uniform speed. On said cylinder a pair of wedge-shaped pistons is mounted diametrically opposed to a similar pair of reactor elements carried by a multiple-splined shaft, said reactor elements and said pistons forming a combustion chamber whereby a gas and air mixture is compressed prior to ignition, whereupon said reactor element moves many degrees oppositely to the uniformly rotating piston while expansion is taking place. This reverse rotation of the reactor element is produced by a gear mechanism which provides a substantial period of reverse rotation and a longer period of rotation in the same direction as the piston, but at a higher speed, whereby the burned gases will be exhausted at the reactor element approaches its mating piston and/or compresses the intake mixture of gas and air between the other pair of piston and reactor element before a second ignition takes place during one revolution of the cylinder.

7 Claims, 12 Drawing Figures

FIG. 5
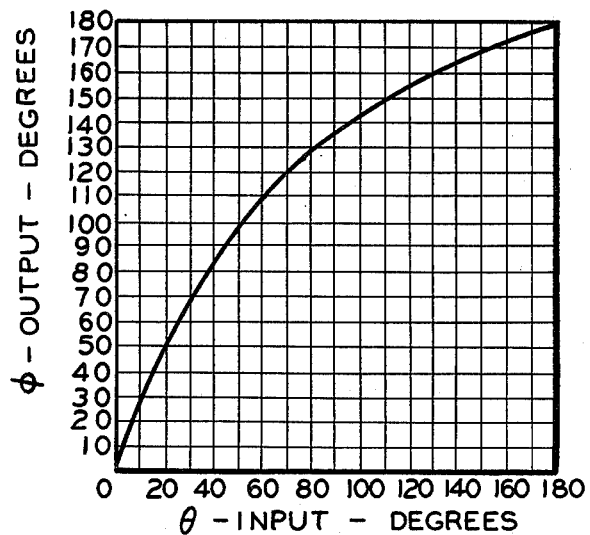
FIG. 6
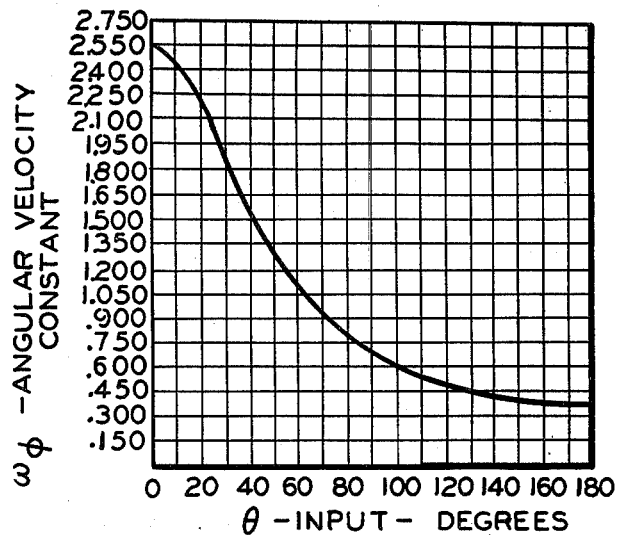
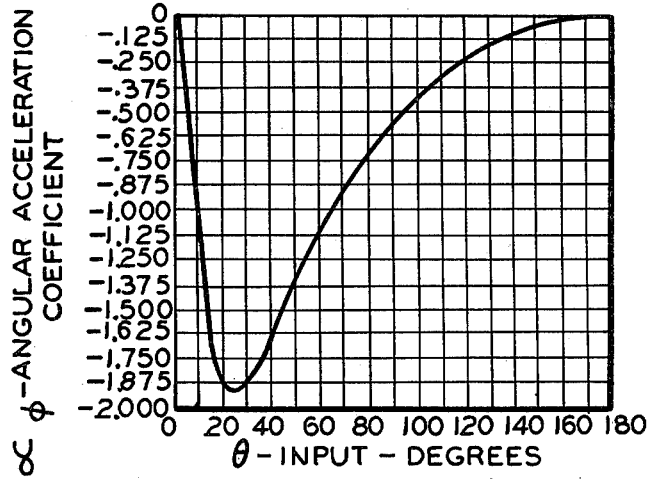
FIG. 7
FIG. 8
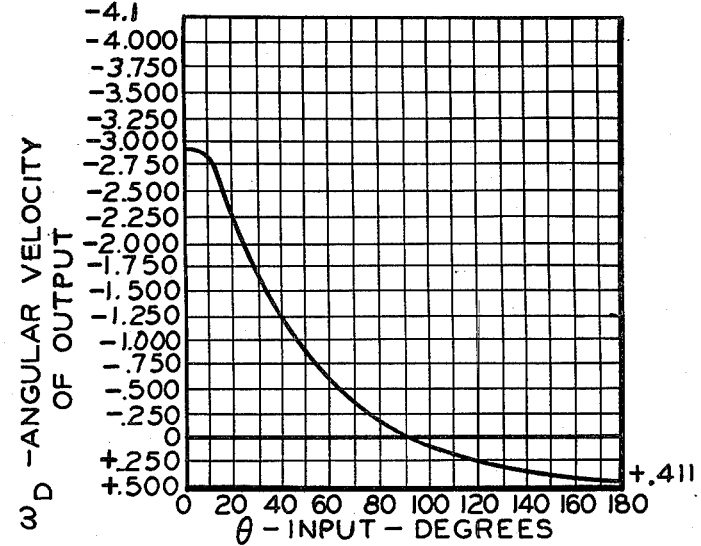

FIG. 11

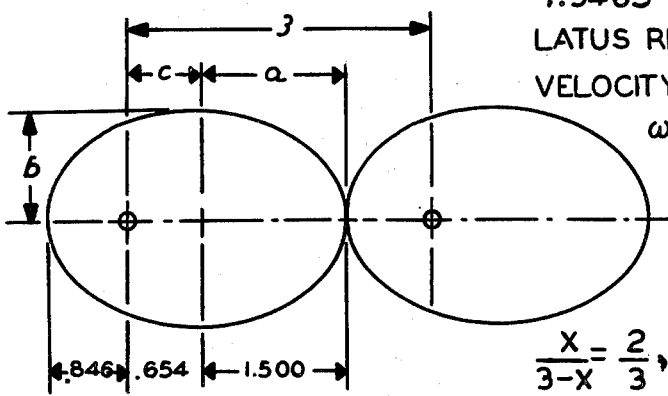

$e = \frac{c}{a} = \frac{.654}{1.500} = .4363$   $c$ = ECCENTRICITY $b = a\sqrt{1-e^2} = 1.5 \times \sqrt{.809904} = 1.5 \times .899 = 1.3485$ LATUS RECTUM $= \frac{2b^2}{a} = 2a(1-e^2) = 2.4297$

VELOCITY OF PINION D (55) = 0, WHEN $\omega_\phi = \frac{2}{3}$ $\frac{x}{3-x} = \frac{2}{3}$,   $3x = 6 - 2x$,   $5x = 6$,   $x = 1.2$ $\frac{\frac{1}{2} \text{LATUS RECTUM}}{1 - e\cos\theta} = \frac{1.2148}{1 - .4363\cos\theta} = 1.2$ $1.2148 = 1.2 - 1.2(.4363\cos\theta)$ $.0148 = -.5232\cos\theta$ $\cos\theta = \frac{.0148}{.5232} = -.02828$   $\theta = 91°\,37'$

FIG. 12

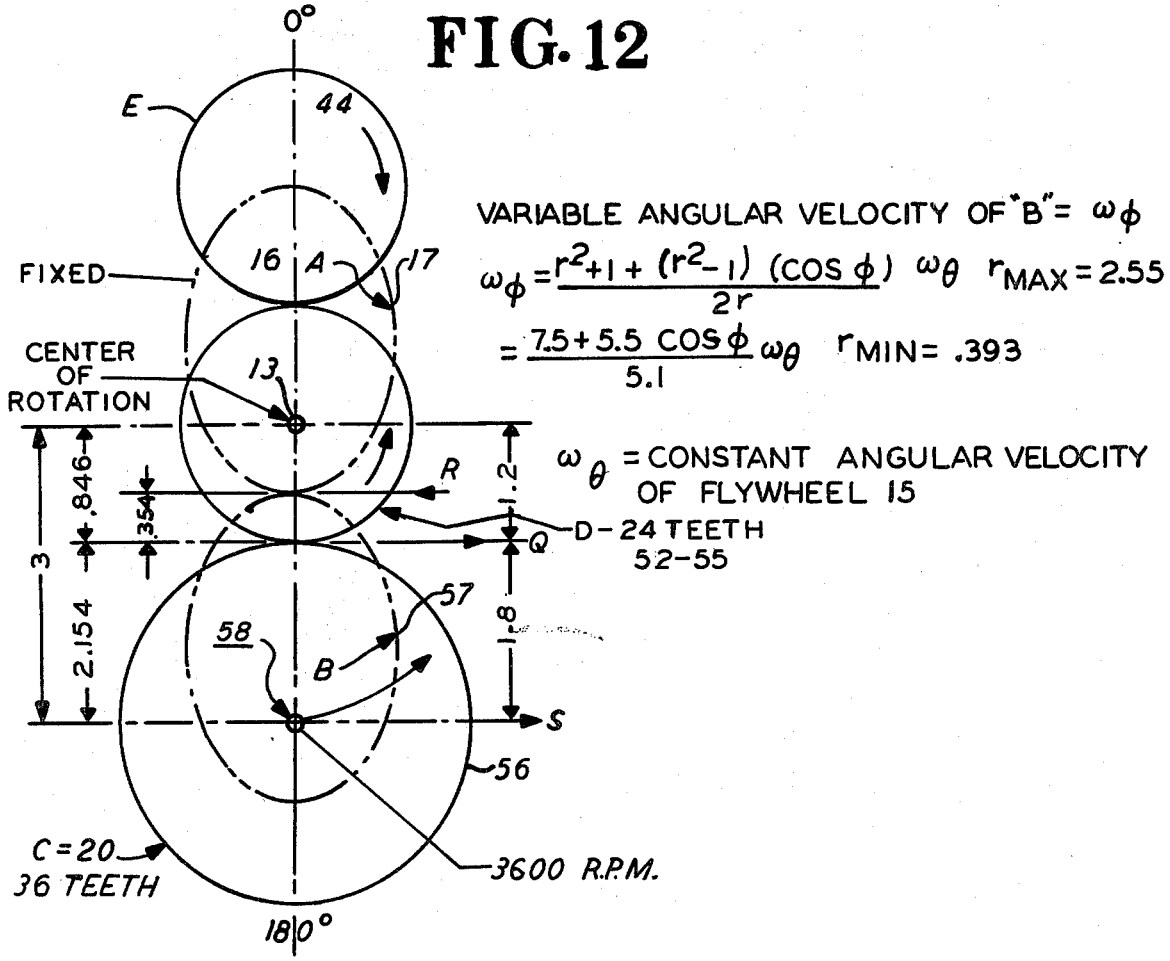

VARIABLE ANGULAR VELOCITY OF "B" $= \omega_\phi$ $\omega_\phi = \frac{r^2 + 1 + (r^2 - 1)(\cos\phi)}{2r}\omega_\theta$   $r_{MAX} = 2.55$ $= \frac{7.5 + 5.5\cos\phi}{5.1}\omega_\theta$   $r_{MIN} = .393$ $\omega_\theta$ = CONSTANT ANGULAR VELOCITY OF FLYWHEEL 15

D - 24 TEETH 52-55

ROTARY INTERNAL COMBUSTION ENGINE WITH UNIFORMLY ROTATING PISTONS COOPERATING WITH REACTION ELEMENTS HAVING A VARYING SPEED OF ROTATION AND OSCILLATING MOTION

Many rotary internal combustion engines have been invented and most of them have not been very successful. One exception thereto is the "Wankel" engine, but this engine presented a difficult problem in the effective sealing of the rotor and the machining of the rotor housing requires special machine tools. The exposure of the rotor gearing to high heat is also an objectionable feature of this engine.

It is, therefore, a primary object of this invention to provide a rotary engine that is composed of simple parts which can be produced on standard machine tools at low cost.

A further object of this invention is the elimination of the multithrow crankshaft of the conventional piston engine.

A still further object is to discard the expensive valve mechanism composed of gearing, cams, valve rods and springs.

It is also an object of this invention to provide an engine which has a constant torque arm as compared to the variable torque arm of a crankshaft engine.

An additional object of this invention is to provide a rotor which can be effectively sealed against compression loss.

A final and most important object of this invention is the utilisation of the counter torque imposed on the reactor at ignition and expansion by means of gearing to the flywheel, said gearing not being exposed to high heat.

GENERAL ARRANGEMENT

The structural elements comprising the rotary engine consist of a water cooled housing having a large cylindrical bore in which a hollow rotor with axially spaced side walls is free to turn and on which two wedge-shaped diametrically opposed pistons are mounted. These side walls have long hubs carrying ball bearings held in the housing.

The pistons cooperate with similarly shaped reaction members enclosed in this cylindrical rotor and they are mounted on a hollow multiple-splined shaft, said shaft having both ends journalled in the long hubs of said rotor. One of said shaft ends has serrations on which a miter gear is mounted, while the other end of said shaft is threaded to receive a lock nut.

The water cooled housing is bolted to a differential gear housing and the latter is bolted to the flywheel housing in which a large flywheel is mounted on a drive shaft.

An elliptic gear is fastened to the flywheel housing and it mates with another elliptic gear which is compounded with a spur gear and this pair is mounted on ball bearings carried by the flywheel. The spur gear mates with a pinion which is integral with a second miter gear, said gear pair turning freely on the drive shaft and it is mounted on roller bearings supported on a long hub of the flywheel, said hub extending into the differential housing and it is supported on a large ball bearing which is held in a large bevel gear whose flange is bolted to the flywheel housing.

The side wall of the rotor next to the differential housing is provide with a yoke on which two large bevel gears are free to turn and these gears mate with the stationary bevel gear which is secured to the flywheel housing and another bevel gear is secured to the long hub of the flywheel.

These bevel gears provide a drive for the rotor which thereby rotates at one-half the speed of the flywheel.

A second yoke is provided on which two smaller bevel pinions are free to turn and they mate with the miter gear on the reactor and the miter spur gear combination.

This second yoke is secured to a long shaft which passes through the hollow multiple-splined shaft of the reactor elements. The latter shaft is held stationary in a bracket secured to the end cover of the rotor housing.

Suitable exhaust and intake ports are provided in the stationary rotor housing at the proper location. Longitudinal, helical slots in the rotor serve as passages to and from the rotor to the porting, and these slots reduce shearing of the reaction member seals.

Two spark plugs projecting through the housing will ignite the gas and air mixture when these slots become aligned with the spark plugs.

FIG. 5 shows the relation between degrees of flywheel rotation and the corresponding motion of the planet elliptical gear;

FIG. 6 shows the angular velocity constant of the planet elliptical gear corresponding to a position of the flywheel;

FIG. 7 shows the angular acceleration coefficient of the planet elliptical gear corresponding to a position of the flywheel;

FIG. 8 shows the angular velocity of the output member of the reverted gear train receiving power from the reactor of the rotary engine;

Figure 10:
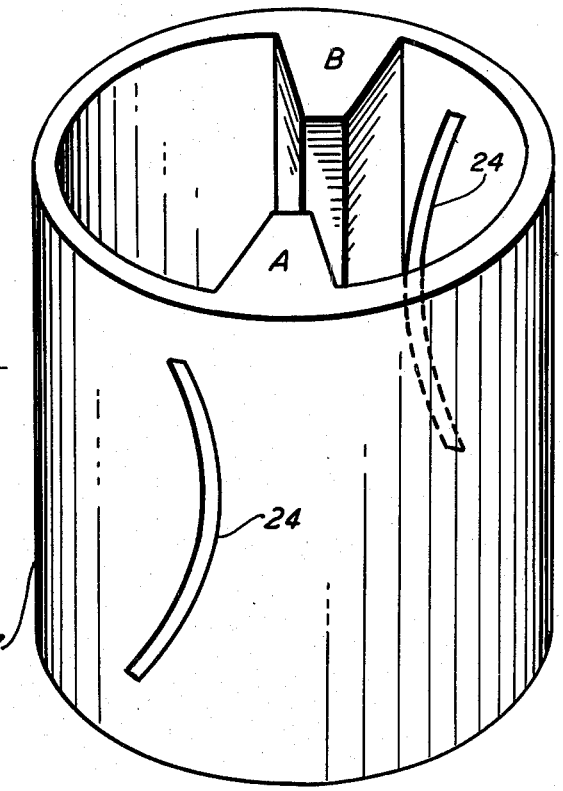
Figure 9:
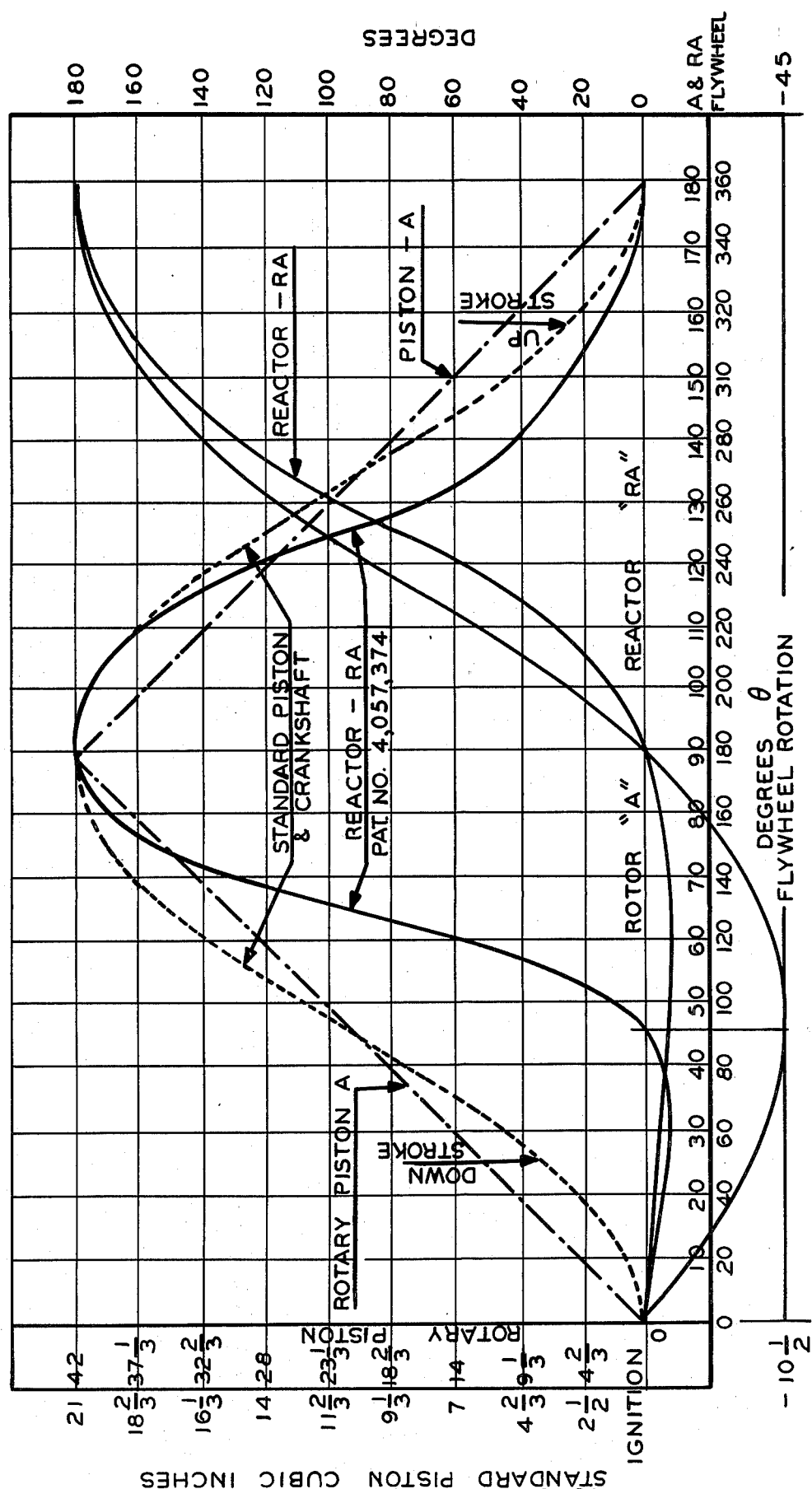

FIG. 9 compares the combustion chamber volume of a standard piston-crankshaft engine to that of rotary engine U.S. Pat. No. 4,057,374 and to the new improved rotary engine and it shows also the reactor positions corresponding to different degrees of flywheel rotation;

FIG. 10 is a view of the engine rotor showing axial, helical slots adjacent to each piston face;

FIG. 11 shows the method used in computing the flywheel position when the angular velocity of the planet elliptic gear is $\frac{2}{3}$ and the angular velocity of the reaction gearing is zero;

FIG. 12 shows the formula used in computing the angular velocity of the planet elliptical gear and the torques imposed on the gears and the flywheel.

DESCRIPTION OF THE IMPROVED INTERNAL COMBUSTION ENGINE

The components of the engine may be divided into five assemblies:
1. The flywheel housing assembly
2. The flywheel and its associated gearing
3. The rotor assembly 4. The reactor assembly
5. The differential drive assembly 1. The flywheel housing 10 is provided with a ball bearing 11 to support one end of a drive shaft 13. An elliptic reaction gear 17 is fastened to the housing 10 by means of the screws 18. A large bevel gear 19 is provided with a flange to permit bolting said bevel gear to the housing.

2. The flywheel assembly with its associated gearing comprises a flywheel 15 secured to a shaft 13. A compound gear is mounted eccentrically to said shaft, said compound gear comprising an elliptic gear 57 meshing with the stationary elliptic gear 17, and a spur gear 56 meshing with pinion 55. This compound gear is journalled on ball bearings 58 held in the flywheel 15. The latter is provided with a long hub 51 which is journalled in a large ball bearing 59 held in the large bevel gear 19. A bevel gear 50 is secured to the end of said long hub 51.

3. The rotor assembly comprises a compartment 14 having a large cylindrical bore 26 into which a rotor 27 is closely fitted for rotation therein. This compartment is provided with cavities 28 for the reception of cooling water. The rotor 27 has side walls 29 and 30 from which project hubs 31 and 32 respectively, and they are journalled in snap-ring ball bearings 33 and 34 respectively supported on the differential housing 12 and the end cover 16. A yoke 39 is integral with the hub 31. Compartment 14 is provided with flanges 25 for bolting. The rotor compartment 14 is also provided with an exhaust port 36 and an intake port 37. Two spark plugs 38 are spaced on top of the rotor compartment 14. Between the walls 29 and 30 two diametrically opposed wedge-shaped pistons A an B are secured to the rotor 27, and adjacent thereto are axial, longitudinal slots 24 and they serve as intake and exhaust passages for the air and gas mixture.

4. The reactor assembly comprises two wedge-shaped reaction elements RA and RB spaced between end walls adjacent to the side walls 29 and 30 of the rotor 27 and seals 35 are provided in grooves on the top and the sides of these wedge-shaped reaction elements. The latter are held in grooves of a sleeve 43 which is fitted on the long and hollow multiple-splined shaft 42. This shaft is journalled in the hubs 31 and 32 of the rotor 27. On one end of shaft 42 an adjusting nut and washer 46 is in contact with the hub 32 and the ball bearing 33, whereby the rotor 27 and the reactors RA and RB are held in their correct location and still permit longitudinal expansion due to heating. On the other end of the hollow shaft 42 a miter bevel gear 44 is secured and a thrust bearing 47 is interposed between the yoke 39 and the miter bevel gear 44.

5. The differential drive assembly is contained in the housing 12 which is bolted to the flywheel housing 10 and the rotor compartment 14. A smaller yoke 20 having a long extending shaft 21 integral therewith and which passes thru said hollow shaft 42 and is held in bracket 22 which is secured to the end cover 16. The yoke 20 has a stub shaft 60 journalled in the drive shaft 13. The yoke 20 has a stub shaft 49 on which bevel pinions 48 are free to rotate and they mesh with miter gears 44 and 52, the latter being compounded with spur pinion 55 which meshes with gear 56 of the flywheel 15 assembly. The yoke 39 is provided with studs 23 on which bevel pinions 41 are free to rotate and these pinions mate with the bevel gears 19 and 50.

An elliptic gear pair produces a varying angular rotation of the driven gear when the driving gear has a uniform angular rotation. The maximum angular speed of the driven gear is greater than the uniform driving gear speed, it must be no less than $2\frac{1}{2}$ times the driving gear speed, and the minimum angular speed, which is the reciprocal of its maximum speed, will cause a reversal of rotation of the compound gear 52 and 55, and since the reactor miter gear 44 and compound gear 52-55 must make one net revolution of 360° per cycle they will have rotated more than 360° during one cycle.

OPERATION OF THE ENGINE

An elliptic gear pair produces a varying angular rotation of the driven gear when the driving gear has a uniform angular rotation. The maximum angular speed of the driven gear is greater than the uniform driving gear speed, it must be no less than $2\frac{1}{2}$ times the driving gear speed, and the minimum angular speed, which is the reciprocal of its maximum speed, will cause a reversal of rotation of spur gear 55, and since said gear 55 must make one net revolution of 360 degrees per cycle it will have rotated more than 360 degrees during one cycle.

The variable speed ratios of spur gear 55 corresponding to one revolution of the uniformly rotating flywheel 15 are determined by the well-known step method for planetary gearing, wherein one member remains stationary.

Assume that the flywheel 15, the elliptic gears 17 and 57 are locked together and in this condition they are made to turn (+1) revolution, as shown on the first line below.

Next on the second line the gearing is now assumed to be in its normal unlocked condition, the flywheel 15 is held stationary (0), and the elliptic gear 17 is turned in the opposite (−1) direction, thereby returning gear 17 to its normal stationary condition, and then observe the amount and direction of rotation of the compound gearing comprising the elliptic gears 17 and 57 and the compound spur gears 57 and 55.

Then on the third line are recorded the sum of lines 1 and 2, and it also shows the variable angular velocity in amount and direction of the spur gear 55 for (30 1) revolution of the flywheel 15, the ratio of Gear 56/Gear 55 being equal to 3/2.

| | Flywheel 15 | Elliptic Gear 17 | Spur Gear 55 |
|---|---|---|---|
| | 1 | 1 | 1 |
| Hold | 0 | −1 | $-\frac{\text{Gear 17} \times \text{Gear 56}}{\text{Gear 57} \times \text{Gear 55}}$ |
| | 1 | 0 | $1 - \frac{\text{Gear 17}}{\text{Gear 57}} \times \frac{3}{2}$ |
| Maximum speed of spur gear 55 | | | $1 - (2.55 \times 1.5) = -2.825$ |
| Mean speed of spur gear 55 | | | $1 - (1 \times 1.5) = -.500$ |
| Minimum speed of spur gear 55 | | | $1 - (.393 \times 1.5) = +.411$ |

FIG. 6 shows the velocity ratio of the elliptic gears, their maximum ratio being 2.55:1, their mean ratio being unity, and their minimum ratio being 0.393.

FIG. 8 shows the angular velocity of the spur gear 55, its maximum angular velocity is 2.825 times that of the flywheel, and it turns oppositely. The spur gear 55 will reverse when the angular velocity ratio between the elliptic gears is 2/3 and it occurs when the flywheel has turned 91°37′.

FIG. 11 shows the analytic geometry relations of the ellipse having foci of 3 inches and an eccentricity of 0.4363 inches.

As the rotor speed is ½ that of the flywheel the rotor with pistons will have turned approximately 90 degrees before the reactor elements begin to turn slowly in the same direction. Expansion is still proceeding until the piston uncovers the exhaust port and the expulsion of the burned gas will take place at a rapid rate.

Since there are two sector-shaped combustion chambers in the rotor there will occur two power pulses during one revolution of the rotor and two revolutions of the flywheel, it follows, therefore, that an engine constructed according to the above description is equivalent to a four cylinder piston engine, or a "Wankel" engine having two rotors.

Figure 3:
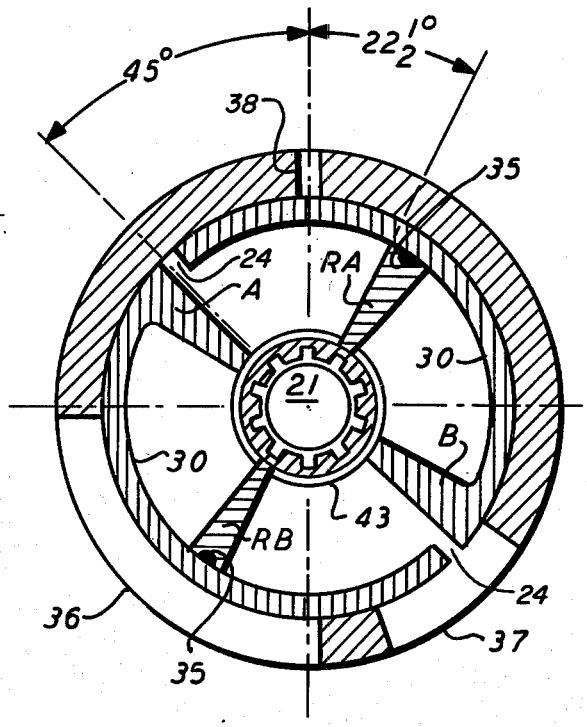
FIG. 3 is a similar section taken along line 2—2 of FIG. 1, showing the position of the piston and the reactor midway during the expansion of the air and gas combustion.
Figure 4:
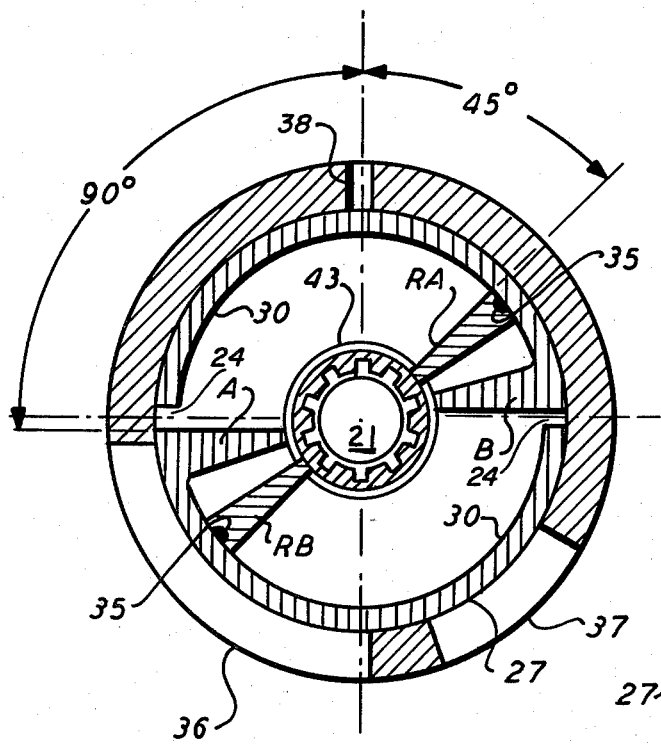
FIG. 4 is also a section taken along line 2—2 of FIG. 1, showing the position of the pistons and reactors at the completion of the expansion.

The expansion pressure on the piston and the reaction elements is at all times the same, the amount of power delivered by each varies directly with their speed of rotation, therefore, at the flywheel position $\theta$ equal to 90 degrees, see FIG. 9, and rotor position A at 45 degrees and the reaction element RA position at 22½ degrees, see FIG. 3, there the reaction element delivers 0.411 or 41% of the amount of power delivered by the piston A, see FIG. 8.

Assume the following dimensions for the improved rotary engine:

Rotor bore 26 7 in. in dia. Multiple-splined shaft 47=1 in. dia.

Chamber area ¼ of 0.7854 $(7^2-1^2)=37.7/4=9.35$ in$^2$.

Rotor length 4.5 in. Volume of one chamber $9.35 \times 4.5 = 42$ in$^3$.

Piston area A = $3 \times 4.5 = 13.5$ in$^2$.

Mean effective pressure P=100 lb. per sq.in. acting on the above area at 2.1 in. radius or 0.175 ft. on an 90 degree arc or $\pi/2$ radians L=0.276 ft.

Revolutions per min. N=1800

Intakes per revolution 2

$$HP = \frac{2\,PLAN}{33000} = \frac{2 \times 100 \times .276 \times 13.5 \times 1800}{33000} = 40.5$$

In the above computation no account was taken of the power which would have been delivered by the reaction element thru the gearing to the flywheel.

Volume of gas per min. $2 \times 42 \times 1800 = 151{,}200$ in.$^3$ per min.

A standard 4-cylinder crank shaft engine having a 3 inch bore and a 3 inch stroke at a speed of 3600 R.P.M. would have Volume of gas $3 \times 7 = 21$ in.$^3$ Volume of gas per min. $2 \times 21 \times 3600 = 151{,}200$ in.$^3$ per min.

$$HP = \frac{2\,PLAN}{33000} = \frac{2 \times 100 \times .25 \times 7 \times 3600}{33000} = 38.2$$

Figure 1:
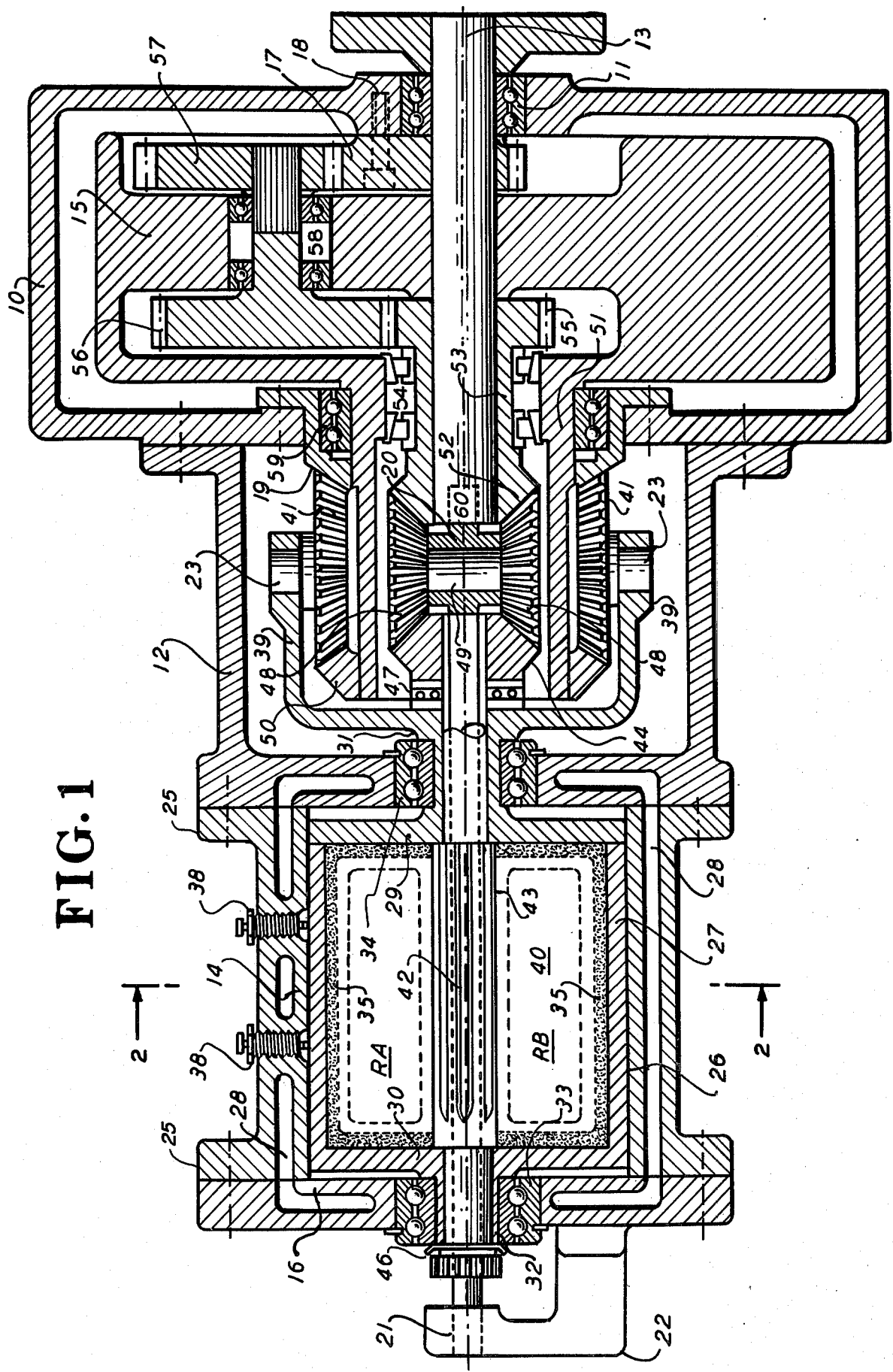
FIG. 1 is a transverse section of the two-piston rotary engine.
Figure 2:
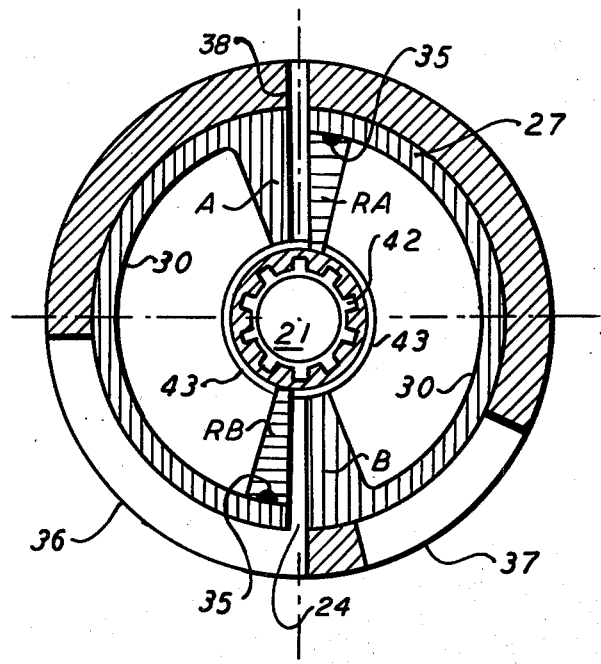
FIG. 2 is a section taken along line 2—2 of FIG. 1.

On FIG. 12 is shown the configuration of the gearing when the reactor element RA has moved to the position as shown in FIG. 2 and it has attained its maximum angular velocity of 0.411 of flywheel speed.

Since the flywheel usually rotates counter-clockwise (−) when viewed from the driver's seat, its rotation is indicated by "S". The rotor piston A will also rotate in a counter-clockwise direction, but at ½ the flywheel speed, therefore, the reactor RA will rotate clockwise (+) with the miter pinion 44 thereon and making compound gear 55 turn counter-clockwise (−).

As stated before the torque "T" caused by the expanding gas is the same for piston A and the reactor element RA, therefore, the tooth pressure "Q" on spur gears 55 and 56 is T/1.2, "T" being in inch-pounds.

From this it is possible to determine the load "S" at point "B" of of the flywheel 15, the tooth on elliptic gear 17 serving as the reaction fulcrum "R".

Then taking moments around "R", we have $0.354 \times Q = 2.154\ S$ then load $$\text{"S"} = \frac{.354 \times T}{2.154 \times 1.2}$$

pounds = 0.1369 T pounds

Torque at "B" = $3 \times$ load "S" = $3 \times 0.1369\ T = 0.4108\ T$

Speed of Flywheel 15 = 3600 R.P.M.

Reaction element power $0.4108\ T \times 3600 = 1480\ T$

The power transmitted by the piston "A" = 1800 T $$\text{Ratio} = \frac{\text{Reaction element power } RA}{\text{Piston power } A} = \frac{1480\ T}{1800\ T} = .82$$

In other words, the reaction element RA transmits 82% as much power as is delivered by piston A at the 180 degree position of the flywheel 15.

A complete calculation by computer using the Fortran method the ratio Q/S of the moment arms was 0.354/2.154, designated by symbol "M" on the computer read-out, at the 90 and 270 degree positions of the flywheel it would be zero, therefore, the average ratio between the 90 amd 270 degree positions by computer was 0.100, then the average power transmitted by the reaction element $$RA \text{ is} = \frac{3 \times .100 \times 3600 \times T}{1.2} = 900\ T$$

$$\text{Ratio} = \frac{\text{Reaction element power } RA}{\text{Piston power } A} = \frac{900\ T}{1800\ T} = .500$$

The computer also traced the curves shown in FIGS. 5, 6, 7, and 8 from the read-out data.

It is important, when making a comparison between a standard crankshaft-piston engine (the Wankel Engine has eccentrics) and the described rotary engine to call attention to their inherent kinematic defficiency.

At ignition, the gas pressure induced torque on the crankshaft is zero, while the rotary engine has a constant torque arm throughout the combustion cycle. The average value of the torque arm of a piston engine is 0.636 times the crankthrow.

I claim:

1. An improved rotary internal combustion engine comprising in combination:
   a. a first housing having a circular bore, exhaust and intake ports, water cooling cavities and ignition means,
   b. two flanges for bolting said housing,
   c. a hollow cylindrical rotor rotatable in said circular bore, two diametrically opposed wedge-shaped pistons integral with said rotor, and axial, helical slots adjacent to said pistons,
   d. side walls on said rotor with first and second hubs thereon for mounting snap-ring bearings, e. an end cover having water cooling cavities and bolted to said first housing and supporting one of said snap-ring bearings,
f. a yoke secured to one of said hubs,
g. a hollow multiple-splined shaft journalled in said first and second hubs, one end of said shaft being threaded to receive adjustable locking means, the other longer end of said shaft mounting a miter gear,
h. a reactor element having two diametrically opposed wedge-shaped means integral with a long hub, said hub being splined and mounted on said multiple-splined shaft, and grooves in said wedge-shaped means to receive seals,
i. a second housing having water cooling cavities and supporting the other of said snap-ring bearings and being bolted to said first housing,
j. a third larger housing having bolted thereto said second housing,
k. a drive shaft supported on a first ball bearing held in said third housing,
l. a large flywheel secured to said drive shaft, said flywheel having a long hub extending into said second housing and having a large bevel gear secured to said long hub,
m. a second large, flanged bevel gear is secured to said third housing, and a ball bearing in said flange is supporting said long hub of said flywheel,
n. bevel pinions rotating on studs held in said yoke and mating with said large bevel gear and said flanged bevel gear,
o. a first compound gear mounted on ball bearings supporting on said flywheel, said compound gear comprising a first spur gear and a first elliptic gear,
p. a second ellipitc gear secured to said third housing and mating with said first elliptic gear,
q. a second compound gear mounted on roller bearings and comprising a second spur gear mating with said first spur gear and a miter gear, said second compound gear being feee to rotate on said drive shaft,
r. a second shaft inserted freely within said hollow multiple-splined shaft, and having on one end a second yoke with studs on which miter pinions are free to rotate and mating with said miter on said multiple-splined shaft and the miter gear of said second compound gear,
s. said second shaft being secured to a bracket bolted to said end cover,
t. whereby, after ignition, the expanding gas causes the reactor element at first to turn in a direction opposite to that of the piston and to exert a useful driving force on the piston as well as on the reactor element, thereby augmenting the delivered power of the engine substantially.

2. An improved rotary internal combustion engine comprising in combination the elements set forth in claim 1, whereby the miter gear on said multiple-splined shaft will receive, after ignition, a varying motion comprising a considerable reverse motion to be followed by a greater forward motion in excess of 180 degrees, said angular reverse motion being equal to said excess.

3. An improved rotary internal combustion engine comprising in combination the elements set forth in claim 1, in which the velocity ratio between said first and second elliptic-gear pair must be greater than $2\frac{1}{2}$ times flywheel speed.

4. An improved rotary internal combustion engine comprising in combination the elements set forth in claim 1, in which the spur gear of said second compound gear is $\frac{2}{3}$ the size of the spur gear of said first compound gear.

5. An improved rotary internal combustion engine comprising in combination the elements set forth in claim 1, in which the bevel pinions on said first yoke planet around said flanged bevel gear, thereby driving the bevel gear on said flywheel, whereby it makes two revolutions per cycle to one of said rotor.

6. A rotary internal combustion engine comprising in combination, three connected stationary housings, one to support a rotor having first and second hubs and a yoke having planetary miter pinions thereon, said yoke turning within a second housing, said rotor having wedge-shaped pistons secured thereon and cooperating with wedge-shaped reaction elements rotatable within said rotor and mounted on a hollow shaft on which a miter pinion is secured, said shaft rotating in said first and second hubs, a third housing having a flanged bevel gear secured thereon, which mates with said planetary miter pinions, a ball bearing supporting a drive shaft, a flywheel secured thereto, said flywheel having a long hub and a large bevel gear secured thereto and mated with said planetary miter pinions, said flywheel supporting a compound planetary gear set composed of a spur gear and an elliptic gear which mates with an elliptic gear secured to said third housing, a second compound gear comprising a spur gear and a miter pinion freely turning on said drive shaft, said latter spur gear mating with said first spur gear, a second yoke secured to a second stationary shaft mounted within said hollow shaft, said yoke having studs on which miter pinions mate with said rotor miter gear and said compound miter gear, whereby, following the ignition of a mixture of gas and air compressed between one set of pistons and reaction elements the resulting expansive force is transmitted to the interconnected gearing to said shaft and to said flywheel, while the other set of pistons and reaction elements exhausts the burned mixture of gas and air.

7. An improved rotary internal combustion engine comprising in combination: three connected housings, a rotor with pistons turning freely in a bore of a first housing, a speed increasing means rotating freely within a second housing, said means comprising a first yoke with bevel pinions thereon, a large bevel gear connected to a third housing and mating with said pinions and a second large bevel gear secured to a flywheel, said flywheel being secured to a drive shaft, said shaft being journalled in bearings held in said third housing, reaction elements cooperating with said pistons and mounted on a hollow shaft and journalled on said rotor, a stationary shaft mounted within said hollow shaft and being connected to a second yoke with bevel pinions freely rotating thereon, a bevel pinion secured to said hollow shaft, a first compound gear comprising a bevel pinion and a first spur gear, the bevel pinions on said second yoke mating with the pinion on said hollow shaft and the bevel pinion of said first compound gear, a second compound gear comprising a spur gear and a first elliptic gear, said second compound gear being eccentrically mounted on bearings held in said flywheel, the spur gear of said second compound gear mating with the spur gear of said first compound gear, a second elliptic gear mating with said first elliptic gear being secured to said third housing and serving as the reactor for transmitting to the flywheel, after ignition, the reactor element torque produced during the combustion period and combine it with the piston torque.

* * * * *